United States Patent
Liu et al.

(10) Patent No.: US 12,192,939 B2
(45) Date of Patent: Jan. 7, 2025

(54) TRANSMISSION CONTROL METHOD AND APPARATUS, TERMINAL, BASE STATION, COMMUNICATION SYSTEM AND STORAGE MEDIUM

(71) Applicant: ZTE Corporation, Guangdong (CN)

(72) Inventors: Kun Liu, Guangdong (CN); Bo Dai, Guangdong (CN); Xiubin Sha, Guangdong (CN); Huiying Fang, Guangdong (CN); Weiwei Yang, Guangdong (CN); Luanjian Bian, Guangdong (CN); Youjun Hu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 439 days.

(21) Appl. No.: 17/599,460

(22) PCT Filed: Mar. 18, 2020

(86) PCT No.: PCT/CN2020/079815
§ 371 (c)(1),
(2) Date: Sep. 28, 2021

(87) PCT Pub. No.: WO2020/192504
PCT Pub. Date: Oct. 1, 2020

(65) Prior Publication Data
US 2022/0201636 A1 Jun. 23, 2022

(30) Foreign Application Priority Data
Mar. 28, 2019 (CN) .......................... 201910241370.7

(51) Int. Cl.
*H04W 56/00* (2009.01)
*H04W 74/0833* (2024.01)
*H04W 76/20* (2018.01)

(52) U.S. Cl.
CPC ... *H04W 56/0045* (2013.01); *H04W 74/0841* (2013.01); *H04W 76/20* (2018.02)

(58) Field of Classification Search
None
See application file for complete search history.

(56) References Cited

U.S. PATENT DOCUMENTS

2017/0374688 A1* 12/2017 Lee .......................... H04L 5/001
2018/0152906 A1   5/2018 Kim et al.
(Continued)

FOREIGN PATENT DOCUMENTS

CN    102281626 A    12/2011
CN    103959842 A    7/2014
(Continued)

OTHER PUBLICATIONS

International Search Report and Written Opinion for International Application No. PCT/CN2020/079815, mailed Jun. 8, 2020.
(Continued)

*Primary Examiner* — Hong S Cho
(74) *Attorney, Agent, or Firm* — Wolf, Greenfield & Sacks, P.C.

(57) ABSTRACT

A transmission control method and apparatus, a terminal device, a base station, a communication system, and a non-transitory computer-readable storage medium are disclosed. The transmission control method may include: judging validation of Timing Advance (TA); and initiating a random access procedure in response to the TA being in an invalid state.

10 Claims, 7 Drawing Sheets

(56) References Cited

U.S. PATENT DOCUMENTS

| | | | | |
|---|---|---|---|---|
| 2019/0289660 A1* | 9/2019 | Yi | ................... | H04W 74/0833 |
| 2021/0297976 A1* | 9/2021 | Medina Acosta | ... | H04W 56/003 |
| 2021/0306968 A1* | 9/2021 | Liberg | ................ | H04B 17/318 |
| 2023/0209609 A1* | 6/2023 | Lee | ..................... | H04W 76/27 |
| | | | | 370/329 |

FOREIGN PATENT DOCUMENTS

| | | |
|---|---|---|
| CN | 104185277 A | 12/2014 |
| CN | 107801244 A | 3/2018 |
| CN | 110536471 A | 12/2019 |
| WO | WO 2014/116018 A1 | 7/2017 |

OTHER PUBLICATIONS

Extended European Search Report dated Feb. 27, 2023 in connection with European Application No. 20777140.3.

First Office Action for Chinese Application No. 2019110241370.7, dated Jun. 30, 2022.

First Search Report for Chinese Application No. 2019110241370.7, dated Jun. 22, 2022.

Partial Supplementary European Search Report dated Nov. 25, 2022 in connection with European Application No. 20777140.3.

Second Office Action for Chinese Application No. 2019110241370.7, dated Sep. 23, 2022.

[No Author Listed], Feature lead summary of Support for transmission in preconfigured UL resources. Huawei, HiSilicon. 3GPP Draft; R1-1813717. 3GPP TSG RAN WG1 Meeting #95. Nov. 13, 2018, 20pages.

[No Author Listed], LTE-M Preconfigured UL Resources Summary RAN1 #95. Sierra Wireless. 3GPP Draft; R1-1813725. 3GPP TSG RAN WG1 Meeting #95. Nov. 13, 2018, 9 pages.

* cited by examiner

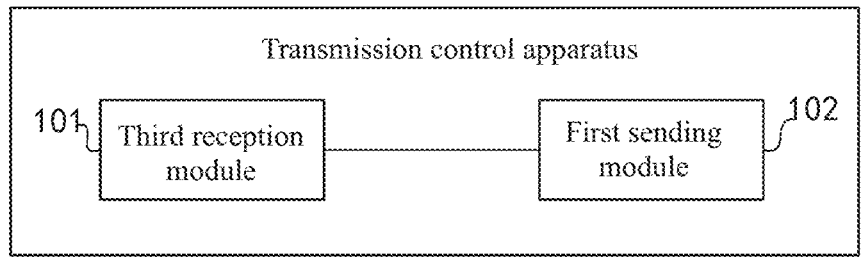
Fig. 10
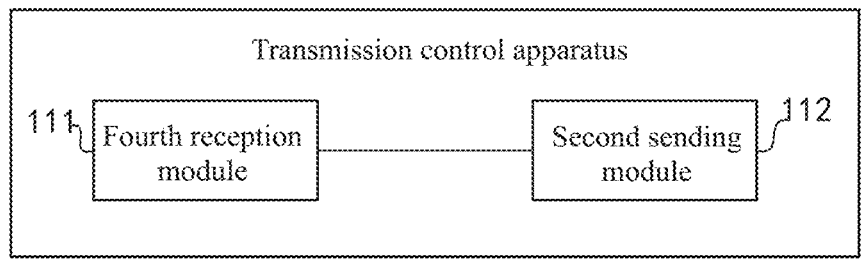
Fig. 11
The terminal device receives a paging message sent by the base station, where the paging message includes configuration information of the first type random access channel. ⎯S121
Fig. 12
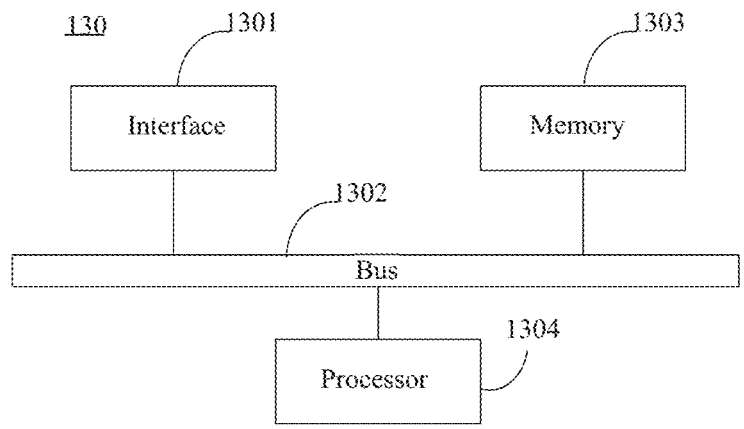
Fig. 13

TRANSMISSION CONTROL METHOD AND APPARATUS, TERMINAL, BASE STATION, COMMUNICATION SYSTEM AND STORAGE MEDIUM

CROSS-REFERENCE TO RELATED APPLICATION

This application is a national stage filing under 35 U.S.C. § 371 of International Patent Application Serial No. PCT/CN2020/079815, filed Mar. 18, 2020, which claims the priority to Chinese patent application No. 201910241370.7 filed on Mar. 28, 2019. The contents of these applications are incorporated herein by reference in their entirety.

TECHNICAL FIELD

The present disclosure relates to the field of communication, for example, to a transmission control method, apparatus, terminal device, base station, communication system and non-transitory computer-readable storage medium.

BACKGROUND

With the development of intelligent terminal devices and the enrichment of wireless data application services, the number of users of data in wireless communication networks has greatly increased. Wireless data content is no longer limited to traditional words or images, but also includes increasing multimedia content, such as high-definition video, mobile TV, etc., which leads to explosive growth of wireless communication network traffic. Mobile internet and Internet of Things (IoT) services will become the main driving force for the development of mobile communication.

With regard to the IoT, Third Generation Partnership Project (3GPP), a standards organization, has formulated two representative communication standard protocols, including Machine Type Communication (MTC) and Narrow Band Internet of Things (NB-IOT). With regard to the mobile internet, the 3GPP has recently formulated 5th Generation (5G) New Radio (NR) communication standard protocol.

According to the above communication standard protocol, when there is no data to send or receive, a terminal device enters an idle state (RRC_IDLE) of Radio Resource Control (RRC), thereby saving the power consumption of the terminal device. Before sending or receiving data, the terminal device needs to enter a connected state of RRC (RRC_CONNECT) from RRC_IDLE, and then send or receive data. Entering RRC_CONNECT from RRC_IDLE consumes power energy and system resources of the terminal device.

SUMMARY

An embodiment of the present disclosure provides a transmission control method, which may include: judging validation of Timing Advance (TA); initiating a random access procedure in response to the TA being in an invalid state.

An embodiment of the present disclosure provides a transmission control method, which may include: receiving data sent by a terminal device on a first type channel in an idle state of RRC (RRC_IDLE) or an inactive state of RRC (RRC_INACTIVE); sending designated information to the terminal device through a downlink channel in response to a specific condition being satisfied.

An embodiment of the present disclosure provides a transmission control apparatus, which may include: a judgement module, configured to judge validation of Timing Advance (TA); a random access module, configured to initiate a random access procedure in response to the TA being in an invalid state.

An embodiment of the present disclosure provides a transmission control apparatus, which may include: a third reception module, configured to receive data sent by a terminal device on a first type channel in an idle state of RRC (RRC_IDLE) or an inactive state of RRC (RRC_INACTIVE); a first sending module, configured to send designated information to the terminal device through a downlink channel in response to a specific condition being satisfied.

An embodiment of the present disclosure provides a terminal device, which may include: a memory, configured to store instructions; a processor, configured to read the instructions to execute the method applied to the terminal device according to the embodiments of the present disclosure.

An embodiment of the present disclosure provides a base station, which may include: a memory, configured to store instructions; a processor, configured to read the instructions to execute the method applied to the base station according to the embodiments of the present disclosure.

An embodiment of the present disclosure provides a non-transitory computer-readable storage medium storing a computer program which, when executed by a processor, causes the processor to perform the method according to any one of the embodiments of the present disclosure.

According to the embodiments of the present disclosure, the random access procedure can be initiated when the TA is invalid, thus the TA can be updated from the invalid state to the valid state, such that the terminal device can utilize the first type channel for data transmission for multiple times in RRC_IDLE or RRC_INACTIVE.

BRIEF DESCRIPTION OF DRAWINGS

FIG. 10 is a schematic structural diagram of a transmission control apparatus according to yet another embodiment of the present disclosure;

FIG. 11 is a schematic structural diagram of a transmission control apparatus according to yet another embodiment of the present disclosure;

FIG. 12 is a flowchart of a transmission control method according to yet another embodiment of the present disclosure;

FIG. 13 is a schematic structural diagram of a terminal device according to an embodiment of the present disclosure;

DETAILED DESCRIPTION

Hereinafter, embodiments of the present disclosure will be described in detail with reference to the accompanying drawings. It should be noted that the embodiments in the present disclosure and the features in the embodiments can be arbitrarily combined with each other without conflict.

Figure 1:
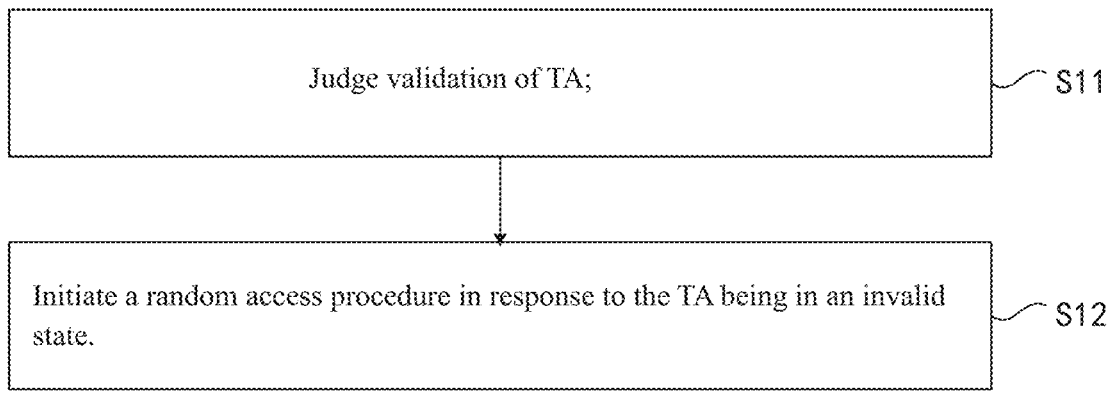
FIG. 1 is a flowchart of a transmission control method according to an embodiment of the present disclosure.

FIG. 1 is a flowchart of a transmission control method according to an embodiment of the present disclosure. As shown in FIG. 1, the transmission control method can be applied to a terminal device, and the method may include the following steps.

At step S11, validation of Timing Advance (TA) is judged.

At step S12, a random access procedure is initiated in response to the TA being in an invalid state.

In the embodiment of the present disclosure, the random access procedure initiated by the terminal device can update the TA from an invalid state to a valid state. It should be noted that initiating random access procedure is only one way to update the TA from the invalid state to the valid state, and other ways can be used to update the TA status. In addition, when the TA is in the invalid state, the TA may not be updated from the invalid state to the valid state, but may give up using the first type channel for data transmission in RRC_IDLE or an inactive state of RRC (RRC_INACTIVE).

In an implementation, the terminal device receives a second message (Msg2) in the random access procedure. The Msg2 includes TA information (tagged as TA1 as assumed) of the terminal device.

In an implementation, the TA of data sent by the terminal device on the first type channel is TA1-TA2. The TA2 can be configured by the base station and sent to the terminal device.

In addition, the TA2 can also be determined according to a cyclic prefix (CP).

In an implementation, the TA2 can be determined according to a length of the CP in various ways, and the examples are as follows.

Example one: TA2=½*CP length.

Example two: TA2=a*CP length, where a value of 'a' may be configured by the base station and then sent to the terminal device, or a default configuration may be adopted in the terminal device.

Figure 2:
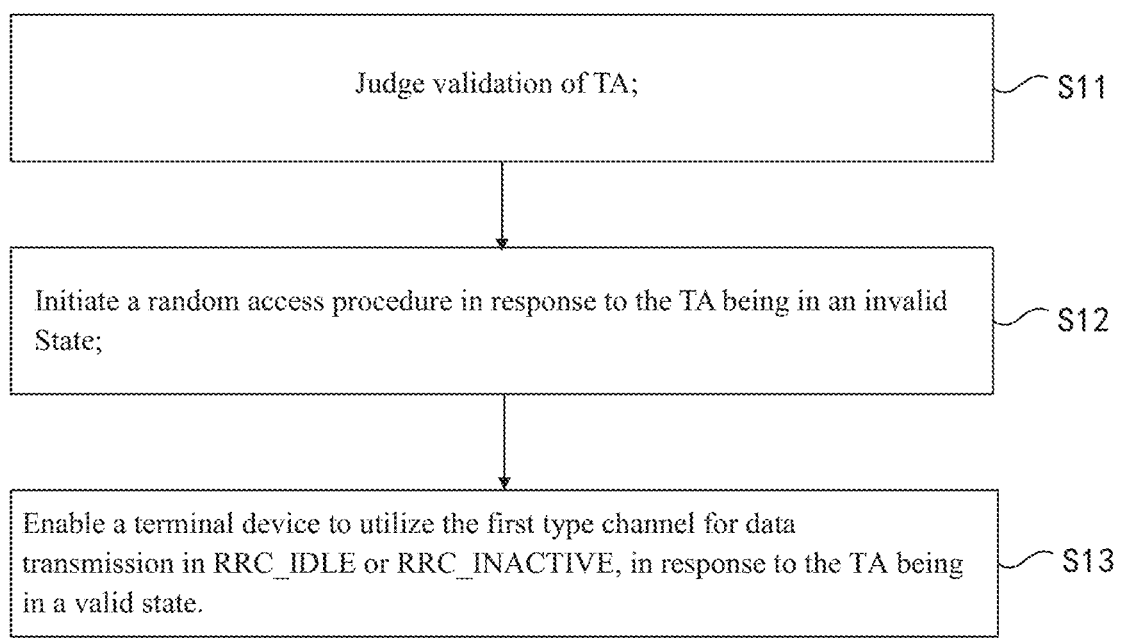
FIG. 2 is a flowchart of a transmission control method according to another embodiment of the present disclosure.

In an implementation, as shown in FIG. 2, the method further includes the following step.

At step S13, in response to the TA being in a valid state, the terminal device is enabled to use the first type channel for data transmission in RRC_IDLE or RRC_INACTIVE.

In an embodiment of the present disclosure, configuration information of the first type channel may be sent by the base station to the terminal device through an RRC message in RRC_CONNECT. On the first type channel, the terminal device can transmit uplink data in RRC_IDLE or RRC_INACTIVE. In addition, the resources occupied by the first type channel can be distributed periodically or discretely in the time domain.

In RRC_IDLE or RRC_INACTIVE, if TA is in the valid state, when the terminal device has uplink data to be transmitted, the terminal device can use the first type channel for data transmission. By judging the validation of the TA, the terminal device can use the first type channel for data transmission multiple times in RRC_IDLE or RRC_INACTIVE. In the valid state of the TA, data transmission can be performed without establishing an RRC connection, thus reducing the power consumption of the terminal device and saving system resources.

In an implementation, the TA is determined to be in the invalid state in response to a determination that a specific condition is satisfied at a judgment time. Otherwise, the TA is in a valid state.

In an example, the judgment time is located before a time domain resource of a next first type channel. In another example, the judgment time is located after a time domain resource of a previous first type channel.

In an implementation, the terminal device can determine whether the TA is always valid before judging the validation of the TA at the judgment time. When TA is not always valid, the terminal device starts to judge the validation of the TA. Whether the TA is always valid can be notified to the terminal device by the base station through signaling.

In an implementation, the terminal device may first check whether a serving cell or a camping cell of the terminal device has changed before judging the validation of the TA at the judgment time. If the serving cell or camping cell of the terminal device has changed, it means that the TA is in an invalid state. If the serving cell or camping cell of the terminal device has not changed, other methods may be used to judge the validation of the TA.

In an embodiment of the present disclosure, there are various methods to judge the validation of the TA, and the examples are as follows.

In a first method, the terminal device judges the validation of the TA based on the measurement values of some parameters, such as Reference Signal Receiving Power (RSRP).

In this method, if one of the following conditions is judged to be satisfied at the judgment time, the TA of the terminal device is in an invalid state, otherwise, the TA is in valid state.

(1) At least N1 judgment times in a first set of judgment times, a variation of a first measurement value exceeds a threshold value; where N1 is an integer greater than or equal to 1. For example, assuming N1 is equal to 1, if it is judged that at least one judgment time in the first set of judgment times the variation of the first measurement value exceeds the threshold value, then it indicates that the TA is in an invalid state. The first set of judgment times may be configured by the base station and sent to the terminal device, or a default configuration may be adopted in the terminal device.

(2) At the last N2 judgment times in a first set of judgment times, a variation of a first measurement value exceeds a threshold value; where N1 is an integer greater than or equal to 1. For example, assuming N2 is equal to 1, if it is judged that at the last one judgment time in the first set of judgment times the variation of the first measurement value exceeds the threshold value, then it indicates that the TA is in an invalid state. The last one judgment time in the first set of judgment times may be the judgment time closest to a time domain position of a resource of a next first type channel.

In an embodiment of the present disclosure, the first measurement value includes but is not limited to at least one of: RSRP, Reference Signal Receiving Quality (RSRQ), downlink Signal to Interference plus Noise Ratio (SINR), downlink Signal to Noise Ratio (SNR), uplink SINR, uplink SNR, downlink path loss, or uplink path loss.

In an embodiment of the present disclosure, the threshold value of the first measurement value may be configured by the base station or defined as a default value. The threshold can include one or two values. For different values of the threshold, the variation of the first measurement value exceeding the threshold may include the following situations.

When the threshold includes one value, the variation of the first measurement value satisfies one of the following: [−threshold, +threshold], (−threshold, +threshold), (−threshold, +threshold] or [−threshold, +threshold), which means that the variation of the first measurement value does not exceed the threshold, and the TA is in a valid state. Otherwise, the variation of the first measurement value exceeds the threshold, and the TA is in an invalid state.

When the threshold includes two values, namely threshold 1 and threshold 2, the variation of the first measurement value satisfies one of the following: [threshold 1, threshold 2], (threshold 1, threshold 2), (threshold 1, threshold 2], [threshold 1, threshold 2), which means that the variation of the first measurement value does not exceed the threshold, and the TA is in a valid state. Otherwise, the variation of the first measurement value exceeds the threshold, and the TA is in an invalid state.

In the above examples, [ ] represents a closed interval, and the boundaries of the closed interval are "−threshold" and "+threshold" respectively; ( ) indicates an open interval, and the boundaries of the open interval are "−threshold" and "+threshold" respectively.

In a second method, the terminal device judges the validation of the TA based on a timer. In this method, if one of the following conditions is judged to be satisfied at the judging time, the TA of the terminal device is in an invalid state, otherwise, the TA is in a valid state.

(1) At least M1 judgment times in a second set of judgment times, a timer has expired; where M1 is an integer greater than or equal to 1. For example, assuming M1 is equal to 1, if it is judged that at least one judgment time in the second set of judgment times a timer has expired, then it indicates that the TA is in an invalid state.

(2) At the last M2 judgment times in a second set of judgment times, a timer has expired; where M2 is an integer greater than or equal to 1. For example, assuming M2 is equal to 1, if it is judged that at the last one judgment time in the second set of judgment times a timer has expired, then it indicates that the TA is in an invalid state. The last one judgment time in the second set of judgment times may be the judgment time closest to a time domain position of a resource of a next first type channel.

(3) At the preceding M3 judgment times in a second set of judgment times, a timer has expired; where M3 is an integer greater than or equal to 1. For example, assuming M3 is equal to 1, if it is judged that at the first one judgment time in the second set of judgment times a timer has expired, then it indicates that the TA is in an invalid state. The first one judgment time in the second set of judgment times may be the judgment time farthest to a time domain position of a resource of a next first type channel.

In an embodiment of the present disclosure, the cases where the timer has expired include that the timer has expired at the time of a next first type channel. The second set of judgment times may be configured by the base station and sent to the terminal device, or a default configuration may be adopted.

In an example, a judgment time in the second set of judgment times satisfies at least one of: an interval from a time domain position of a resource used by a next first type channel is greater than or equal to a first time length T1; or an interval from a time domain position of a resource used by a next first type channel is less than or equal to a second time length T2.

In this example, values of T1 and T2 may be configured by the base station or defined as default values.

The function of T1 may include: if it is judged that the TA is in an invalid state, a completion of transition from the invalid state to the valid state of the TA of the terminal device within T1 can be ensured. In this way, the terminal device can continue to use a resource of a next first type channel to send uplink data.

The functions of T2 may include: if the judgment time is too early and it is assumed that the TA is judged to be invalid at this judgment time, the terminal device needs to give up using a resource of a next first type channel to send uplink data; or the terminal device performs the TA update operation before a resource of a next first type channel, to change the TA from the invalid state to the valid state. However, because the judgment time is too early, the base station may update the TA of the terminal device after this judgment time, which leads to a reset of the timer. Then, the timer may not expire at a time of resource of a next first type channel. Therefore, by configuring T2, it can be ensured that the judgment time is not too early.

In a third method, the terminal device judges the validation of the TA based on a measurement value of a certain parameter and a timer. In this method, if one of the following conditions is judged to be satisfied at a judgment time, the TA of the terminal device is in an invalid state, otherwise, the TA is in an valid state.

(1) A timer does not expire at a judgment time in a second set of judgment times; and at least K1 times before the judgment time in the second set of judgment times, a variation of a first measurement value exceeds a threshold value; where K1 is an integer greater than or equal to 1. For example, assuming K1 is equal to 1, if it is judged that a timer does not expire at any judgment time in the second set of judgment times, and at least once before the judgment time a variation of the first measurement value exceeds the threshold value, then it indicates that the TA is in an invalid state.

(2) A timer does not expire at a judgment time in a second set of judgment times; and the last K2 times before the judgment time in the second set of judgment times, a variation of a first measurement value exceeds a threshold value; where K2 is an integer greater than or equal to 1. For example, assuming K2 is equal to 1, if it is judged that a timer does not expire at any judgment time in the second set of judgment times, and at the last one judgment time a variation of the first measurement value exceeds the threshold value, then it indicates that the TA is in an invalid state.

In an application example, in a wireless communication system, a base station (eNB) sends uplink transmission configuration information to a User Equipment (UE), where the uplink channel configuration information includes configuration information of uplink channel resources and configuration information of downlink control channel search space.

The base station configures first type channel resources for the UE through the configuration information of uplink channel resources, where the first type channel resources is configured to support the UE to perform uplink transmission in RRC_IDLE. The downlink control channel configured by the configuration information of the downlink control channel search space corresponds to the first type channel resources. At least HARQ-ACK information corresponding to the first type channel is carried in the downlink control channel.

In this embodiment, the resources occupied by the first type channels are periodically distributed in the time domain. The resource occupied by the first type channel can be called "Preconfigured Uplink Resource (PUR)", and the uplink transmission using the first type channel is called PUR transmission.

In this embodiment, the PUR transmission is performed in RRC_IDLE. The UE needs to judge whether the current TA is in a valid state before PUR transmission, and only when the ta is in a valid state can the UE perform transmit the PUR.

If a serving cell or a camping cell where the UE is located has not changed, the TA is in an invalid state when one or more specific conditions are met. The specific conditions include: judging that the variation of RSRP exceeds the threshold at least one judgment time, where the judgment time is included in the first set of judgment times.

D_RSRP=RSRP1-RSRP0, where D_RSRP is the variation of RSRP; RSRP1 is the RSRP value measured at the current time or the RSRP measurement value stored at the current time; RSRP0 is the RSRP measurement value saved during the latest TA value update.

The judgment time is before PUR transmission, and the number of judgment times is greater than or equal to 0.

In this embodiment, the base station configures the range of D_RSRP as [threshold 1, threshold 2] through signaling. When D_RSRP is within [threshold 1, threshold 2], it means that D_RSRP does not exceed the threshold, so TA is in a valid state. Otherwise, it means that D_RSRP exceeds the threshold, so TA is in an invalid state.

Another embodiment of the present disclosure provides a transmission control method. In step S12 of the above embodiment, initiating a random access procedure (RAP) includes various implementations.

In an implementation, initiating the random access procedure include sending a third message Msg3 of the random access procedure to the base station, where the RRC message carried by the third message carries indication information for indicating RRC release.

In an implementation, initiating a random access procedure further includes receiving a fourth message Msg4 of a random access procedure from a base station, where the fourth message includes an RRC Connection Release message.

In an embodiment of the present disclosure, the RRC message include at least one of: RRC Connection Resume Request; RRC Connection Request; or newly defined RRC message.

In an embodiment of the present disclosure, the indication information for indicating RRC release includes at least one of: RRC Connection Release indication; TA acquisition indication, which may implicitly indicate that RRC Connection Release is triggered; or one or more Information Elements (IE), where the IEs are configured to have predefined values.

In an application example, in a wireless communication system, the base station (eNB) sends uplink transmission configuration information to the UE, where the uplink channel configuration information includes configuration information of uplink channel resources and configuration information of downlink control channel search space.

According to the configuration information of uplink channel resources, the base station configures resources of a first type channel for the UE, where the first type channel resources are configured to support the UE to perform uplink transmission in RRC_IDLE. The downlink control channel configured by the configuration information of the downlink control channel search space corresponds to the first type channel resources. At least HARQ-ACK information corresponding to the first type channel is carried in the downlink control channel.

In this embodiment, the resources occupied by the first type channels are periodically distributed in the time domain.

Before the UE performs uplink transmission on the first type channel, the UE needs to judge whether the current TA is in a valid state. When the TA is in a valid state, the UE can use the first type channel for uplink transmission.

Figure 3A:
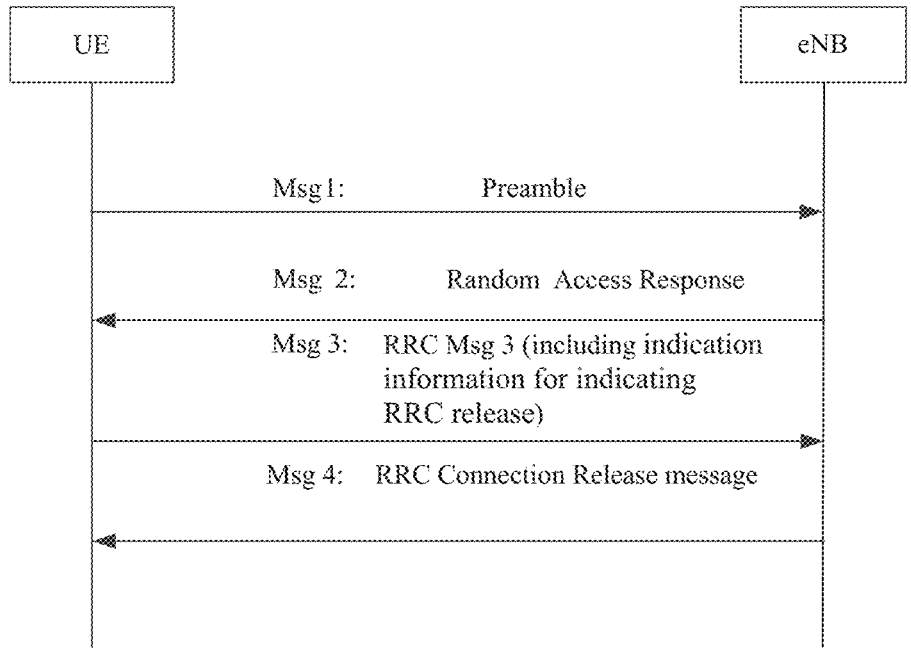
FIG. 3a is a schematic diagram of a random access procedure of a transmission control method according to an embodiment of the present disclosure.

The UE initiates a random access procedure when the UE judges that the TA is in an invalid state. As shown in FIG. 3a, the random access procedure may include the transmission of four messages: Msg1, Msg2, Msg3 and Msg4. The Msg1 sent by the UE to the eNB carries the Preamble, and the Msg2 returned by the eNB to the UE carries the TA information required by the UE.

The UE carries the indication information for indicating RRC release through the RRC message carried in Msg3 in the random access procedure. Upon receiving the Msg3 message sent by the UE, the base station may send a Msg4 message to the UE, in which the Msg4 carries the RRC Connection Release message.

The UE completes the TA acquisition through the random access procedure, and then ends the random access procedure. In this way, the UE can continue to use the first type channel for uplink transmission in RRC_IDLE.

The RRC message carried in Msg3 includes at least one of: RRC Connection Resume Request; or RRC Connection Request.

The indication information for indicating RRC release includes at least one of: explicit RRC Connection Release indication; or explicit TA acquisition indication information implicitly indicating that RRC Connection Release is triggered.

RRC Connection Release is implicitly indicated by an IE in the RRC message carried in Msg3. For example, IE is the establishmentCause, and the meaning of the value configured for the establishmentCause is set as TA acquisition. Therefore, establishmentCause implicitly indicates RRC Connection Release.

In this embodiment of the present disclosure, the validation of the TA can be judged in various ways, if the TA is invalid, the random access procedure can be initiated, and the RRC connection can be released through Msg3 or Msg4 in the random access procedure to keep RRC_IDLE or RRC_INACTIVE. In this way, in RRC_IDLE or RRC_INACTIVE, if the UE has data to transmit, the UE can transmit data on the first type channel. In the TA valid state, data transmission can be performed without entering RRC_CONNECT from RRC_IDLE. Therefore, the UE can continue to use the first type channel to transmit data in RRC_IDLE, which can reduce the power consumption of the UE and save system resources.

In an implementation, initiating the random access procedure includes sending a third message Msg3 of the random access procedure to the base station, where the third message carries UE identification information, where the UE identification information is sent through a Control Element (CE) of Media Access Control (MAC), that is, MAC CE.

The UE identification information includes one of: Cell-Radio Network Temporary Identifier (C-RNTI); Temporary C-RNTI carried in the second message Msg2 of the random access procedure; or Radio Network Temporary Identifier (RNTI) configured for UE to use the first type channel for uplink transmission in RRC_IDLE.

In an application example, in a wireless communication system, the base station (eNB) sends uplink transmission configuration information to the UE, where the uplink channel configuration information includes configuration information of uplink channel resources and configuration information of downlink control channel search space.

According to the configuration information of uplink channel resources, the base station configures resources of a first type channel for the UE, where the first type channel resources are configured to support the UE to perform uplink transmission in RRC_IDLE. The downlink control channel configured by the configuration information of the downlink control channel search space corresponds to the first type channel resources. At least HARQ-ACK information corresponding to the first type channel is carried in the downlink control channel.

The resources occupied by the first type channels are periodically distributed in the time domain. Before the UE performs uplink transmission on the first type channel, the UE needs to judge whether the current TA is in a valid state. When the TA is in a valid state, the UE can use the first type channel for uplink transmission.

Figure 3B:
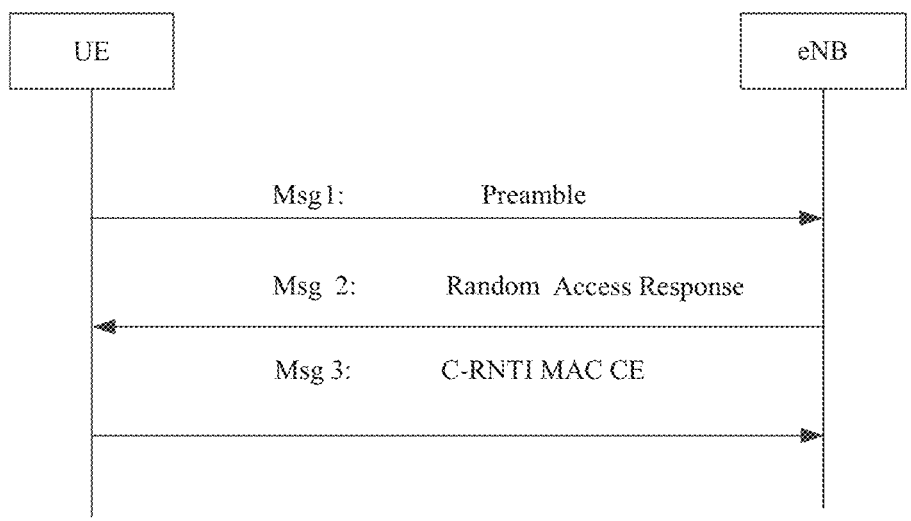
FIG. 3b is a schematic diagram of a random access procedure of a transmission control method according to another embodiment of the present disclosure.

The UE initiates a random access procedure when the UE judges that the TA is in an invalid state. As shown in FIG. 3b, the random access procedure may include the transmission of three messages: Msg1, Msg2, and Msg3. The Msg1 sent by the UE to the eNB carries the Preamble, and the Msg2 returned by the eNB to the UE carries the TA information required by the UE.

The UE completes the TA acquisition through the random access procedure, and then ends the random access procedure. The UE continue to use the first type channel for uplink transmission in RRC_IDLE.

The Msg3 carries UE identification information. The UE identification information can be represented by the C-RNTI carried by the C-RNTI MAC CE. C-RNTI may include one of: C-RNTI; Temporary C-RNTI carried in Msg2; or RNTI configured for UE to perform uplink transmission with the first type channel in RRC_IDLE.

Figure 4:
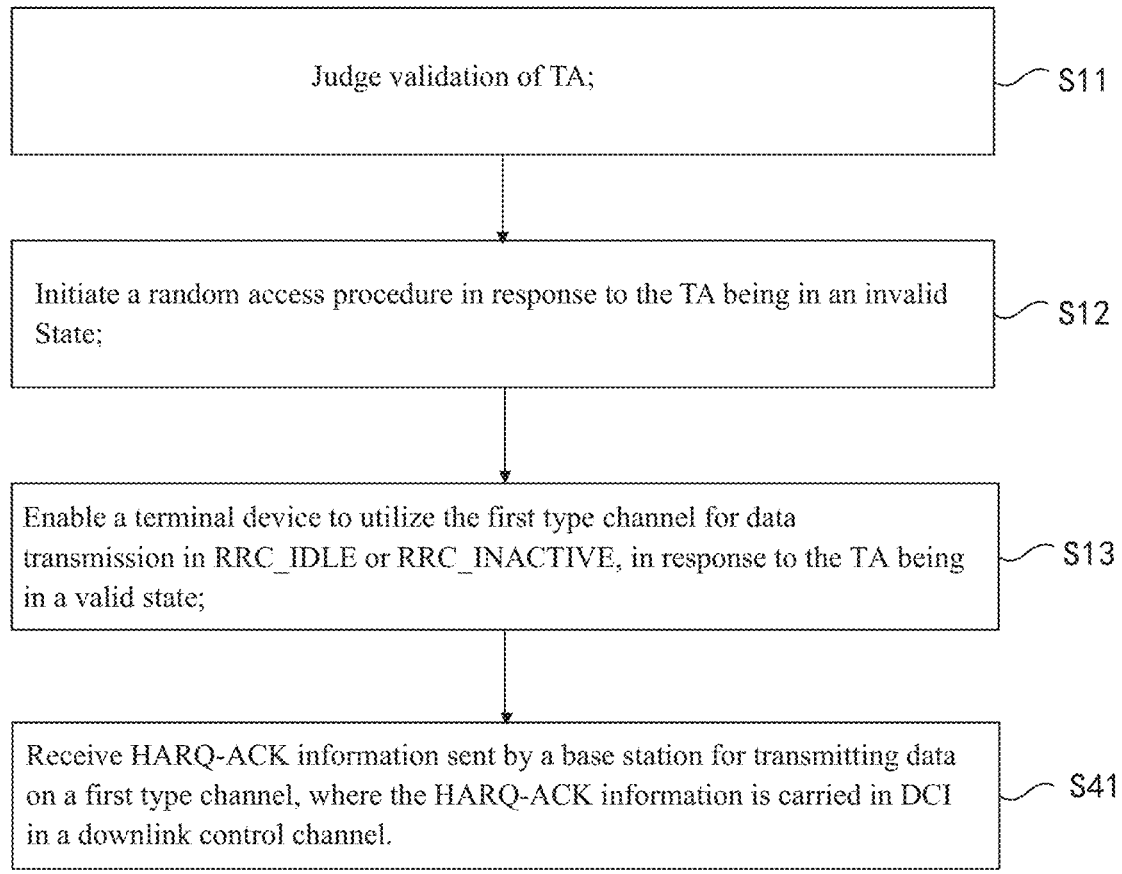
FIG. 4 is a flowchart of a transmission control method according to yet another embodiment of the present disclosure.

FIG. 4 is a flowchart of a transmission control method according to another embodiment of the present disclosure. As shown in FIG. 4, the transmission control method can be applied to a UE. On the basis of the above embodiments, the method further include the following steps.

At step S41, HARQ-ACK information sent by a base station for transmitting data on a first type channel is received, where the HARQ-ACK information is carried in Downlink Control Information (DCI) in a downlink control channel.

The HARQ-ACK information includes a first kind of Acknowledgement (ACK) indication information or a second kind of ACK indication information.

The UE stops a detection on the downlink control channel, in response to the HARQ-ACK information being the first kind of ACK indication information, where the HARQ-ACK information indicates that the data transmitted by the first type channel is correctly received. In this case, the UE waits for the next first type channel, and then continues data transmission.

The UE performs a detection on the downlink control channel, in response to the HARQ-ACK information being the second kind of ACK indication information, where the HARQ-ACK information indicates that the data transmitted by the first type channel is correctly received. The scheduling information of the downlink channel or the scheduling information of the uplink channel can be carried in the downlink control channel. After receiving the scheduling information, the UE can transmit or receive data on the corresponding channel.

In an embodiment of the present disclosure, the base station instruct the UE to find corresponding operations by default through different ACKs, without instructing the UE to perform specific operations through other signaling.

Figure 5:
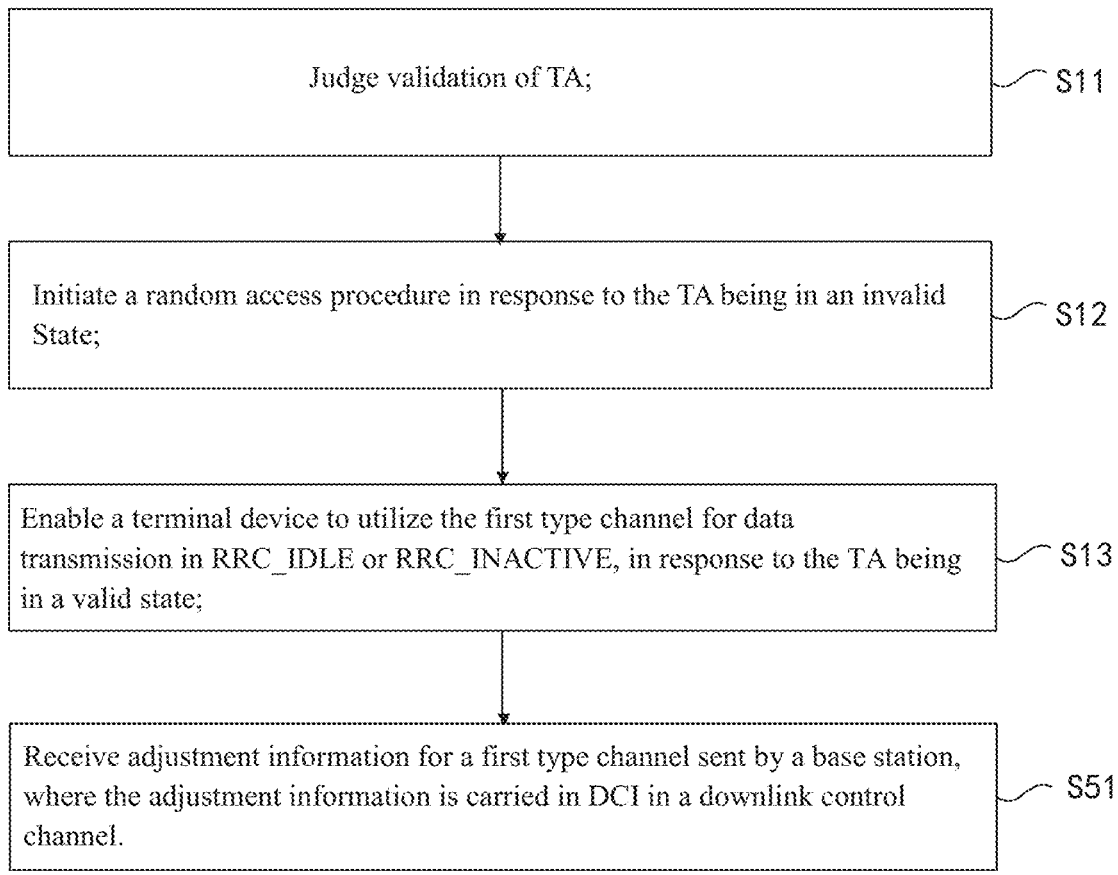
FIG. 5 is a flowchart of a transmission control method according to yet another embodiment of the present disclosure.

FIG. 5 is a flowchart of a transmission control method according to another embodiment of the present disclosure. As shown in FIG. 5, the transmission control method can be applied to the UE. On the basis of the above embodiments, the method further includes the following steps.

At step S51, adjustment information for a first type channel sent by a base station is received, where the adjustment information is carried in DCI in a downlink control channel, and the adjustment information has a value determined according to a power headroom (PHR) corresponding to the first type channel. The power headroom may refer to the remaining power when the UE sends data transmitted by the first type channel, and the power headroom may be transmitted to the base station through the first type channel.

In an implementation, the value of the adjustment information determined according to a power headroom corresponding to the first type channel includes one of: in response to the power headroom being greater than X1, the adjustment information includes a power adjustment value of the first type channel; in response to the power headroom being greater than X2 and less than X1, the adjustment information includes a power adjustment value and a repetition number adjustment value of the first type channel; or in response to the power headroom being less than X2, the adjustment information includes a repetition number adjustment value; where X1 is greater than X2.

In an implementation, determining the power adjustment value of the first type channel according to the size of the power headroom further includes the following scheme. When the power headroom value is PHR1, the power adjustment values of the first type channel include at least one of: $\frac{1}{4}*PHR1$; $\frac{2}{4}*PHR1$; $\frac{3}{4}*PHR1$; $PHR1$; $-\frac{1}{4}*PHR1$; $-\frac{2}{4}*PHR1$; $-\frac{3}{4}*PHR1$; $-PHR1$; or 0.

An embodiment of the present disclosure provides a transmission control method, which includes: receiving data sent by a UE on a first type channel in RRC_IDLE or RRC_INACTIVE; and when a specific condition is satisfied, sending specified information to the UE through a downlink channel.

This embodiment can be applied to the base station. For different types of UE, the base station can send different types of information to adjust the configuration information of the first type channel, so that the configuration information of the first type channel is more suitable for the UE, thus allowing different types of UE to send data on the first type channel in RRC_IDLE or RRC_INACTIVE.

Figure 6:
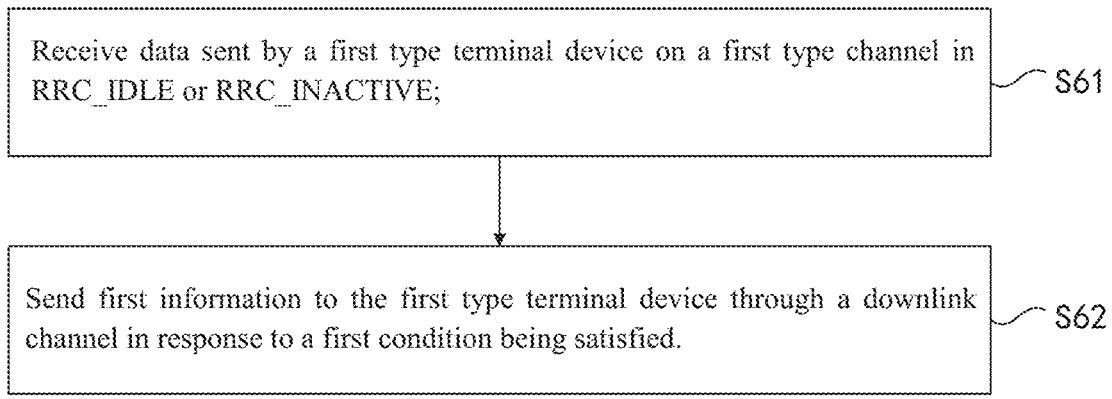
FIG. 6 is a flowchart of a transmission control method according to yet another embodiment of the present disclosure.

FIG. 6 is a flowchart of a transmission control method according to another embodiment of the present disclosure. As shown in FIG. 6, the method can be applied to a base station, assuming that the UE is a first type UE, for example, a UE with a control unit of Mode B (CE Mode B UE), and the method includes the following steps.

At step S61, data sent by a first type UE on a first type channel in RRC_IDLE or RRC_INACTIVE, is received.

At step S62, first information is sent to the first type UE through a downlink channel, in response to a first condition is satisfied.

In this embodiment, the downlink channel may be a downlink control channel or a downlink data channel. The resources occupied by the downlink data channel are instructed by the downlink control channel. For example, the Downlink Grant (DL Grant) carried in the downlink control channel instructs the resources occupied by the downlink data channel.

In this embodiment, the first information is carried in Downlink Control Information (DCI).

In this embodiment, the first type UE is a UE with a control unit of Mode B (CE Mode B UE). CE Mode B UE only includes repetition number adjustment information and TA adjustment information.

In this embodiment, the first information includes at least one of: a repetition number of transmitting on the first type channel; or the TA corresponding to the first type channel.

In an example, the first information may represent complete information or relative information. If the repetition number of transmitting on the first type channel are complete information, it can mean that the repetition number of transmitting on the first type channel need to be configured according to this complete information. If the repetition number of transmitting on the first type channel is relative information, it can be said that this relative information indicates the variation relative to a reference value. The repetition number of transmitting on the first type channel need to be determined on the basis of this reference value and according to this relative information.

In this embodiment, the first condition includes at least one of the following.

(1) A Hybrid Automatic Repeat Request Acknowledgement (HARQ-ACK) indication for data transmitted on the first type channel being an indication of success (ACK).

HARQ-ACK may include an indication of success (ACK) or an indication of failure (NACK). For example, the ACK indicates that the corresponding data transmission has been successfully received by the receiving end, while the NACK indicates that the corresponding data transmission has not been successfully received by the receiving end.

In response to the first condition including a HARQ-ACK indication for data transmitted on the first type channel being ACK, the ACK indicates the number of transmission repetitions and/or the TA, which are corresponding to the first information.

(2) A value of each of one or more fields in Downlink Control Information (DCI) being a predefined value.

For example, the values of these fields implicitly indicate that HARQ-ACK indicates ACK. For example, the configuration information of the search space corresponding to the downlink control channel carrying the DCI is configured by the base station. The configuration information of the search space and the configuration information of the first type channel can be configured by the base station and sent to the UE.

The configuration information of the search space may indicate at least one of: location of time-frequency resources occupied by the downlink control channel; or the repetition number of transmitting on the downlink control channel.

In response to the first condition including a value of each of one or more fields in DCI being a predefined value, the predefined value indicates the number of transmission repetitions and/or the TA, which are corresponding to the first information.

(3) A repetition number of transmitting on the first type channel belonging to a first set of numbers of transmission repetitions. A repetition number of transmitting on the first type channel included in the first set of repetition numbers of transmitting may be greater than or equal to a first numerical value A. The value of A can be configured by the base station or by default.

(4) A coverage enhancement level of the UE corresponding to the first type channel belonging to a first set of coverage enhancement levels. A coverage enhancement level included in the first coverage enhancement level set is greater than or equal to a second numerical value B. The value of B can be configured by the base station or by default.

In an implementation, the first information and the HARQ-ACK may be sent in the same downlink control channel; or, when the value(s) of one or more fields in the DCI are predefined value(s), the first information is carried in the DCI.

(5) A transmitting power of the UE reaching a full power level in response to the UE transmitting data on the first type channel.

(6) A power headroom value indicated by Power Headroom being greater than or equal to a threshold.

Figure 7:
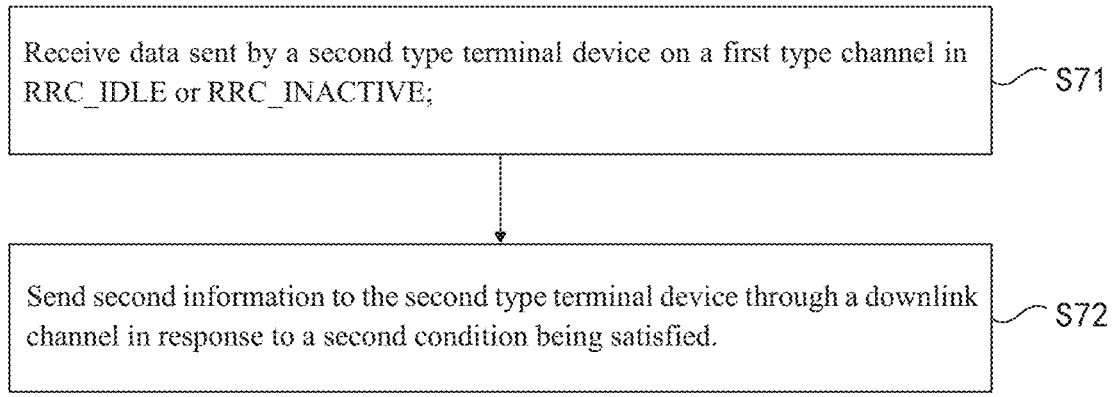
FIG. 7 is a flowchart of a transmission control method according to yet another embodiment of the present disclosure.

FIG. 7 is a flowchart of a transmission control method according to another embodiment of the present disclosure. As shown in FIG. 7, the method can be applied to a base station, assuming that the UE is a second type UE, for example, a UE with a control unit of Mode A (CE Mode A UE), and the method includes the following steps.

At step S71, data sent by a second type UE on a first type channel in RRC_IDLE or RRC_INACTIVE, is received.

At step S72, second information is sent to the second type UE through a downlink channel, in response to a second condition is satisfied.

In this embodiment, the downlink channel may be a downlink control channel or a downlink data channel. The resources occupied by the downlink data channel are instructed by the downlink control channel. For example, the Downlink Grant (DL Grant) carried in the downlink control channel instructs the resources occupied by the downlink data channel.

In this embodiment, the second information is carried in Downlink Control Information (DCI).

In this embodiment, the second type UE is a UE with a control unit of Mode A (CE Mode A UE). CE Mode A UE includes Power, Repetition number adjustment information and TA adjustment information.

In this embodiment, the second information includes at least one of: a repetition number of transmitting on the first type channel; transmitting power information of a first type channel; or the TA corresponding to the first type channel.

For example, the second information includes the repetition number of transmitting on the first type channel and the transmitting power information of the first type channel; or the second information includes the TA corresponding to the first type channel; or the second information includes the repetition number of transmitting on the first type channel, the transmitting power information of the first type channel and the TA corresponding to the first type channel.

In this embodiment, the second condition includes at least one of the following.

(1) An HARQ-ACK indication for data transmitted on the first type channel being ACK. In response to the second condition including a HARQ-ACK indication for data transmitted on the first type channel being ACK, the ACK indicates one of or a combination of: the number of transmission repetitions, the transmitting power information and the TA, which are corresponding to the second information.

(2) A value of each of one or more fields in DCI being a predefined value. In response to the second condition including a value of each of one or more fields in DCI being a predefined value, the predefined value indicates one of or a combination of: the number of transmission repetitions, the transmitting power information and the TA, which are corresponding to the second information.

(3) A repetition number of transmitting on the first type channel belonging to a second set of numbers of transmission repetitions. A repetition number of transmitting on the first type channel included in the second set of repetition numbers of transmitting may be less than or equal to a third numerical value C. The value of C can be configured by the base station or by default.

(4) A coverage enhancement level of the UE corresponding to the first type channel belonging to a second set of coverage enhancement levels. A coverage enhancement level included in the second coverage enhancement level set is less than or equal to a fourth numerical value D. The value of D can be configured by the base station or by default.

In an implementation, the second information and the HARQ-ACK may be sent in the same downlink control channel; or, when the value(s) of one or more fields in the DCI are predefined value(s), the second information is carried in the DCI.

(5) A transmitting power of the UE not reaching a full power level in response to the UE transmitting data on the first type channel.

(6) A power headroom value indicated by Power Headroom being greater than or equal to a threshold.

In an application example, in a wireless communication system, a base station (eNB) sends uplink transmission configuration information to a UE, where the uplink channel configuration information includes configuration information of uplink channel resources and configuration information of downlink control channel search space.

The base station configures first type channel resources for the UE through the configuration information of uplink channel resources. A first type downlink control channel configured by the configuration information of the downlink control channel search space corresponds to the first type channel resources. At least HARQ-ACK information corresponding to the first type channel is carried in the first type downlink control channel.

In this embodiment, the resources occupied by the first type channels are periodically distributed in the time domain. The resource occupied by the first type channel can be called "Preconfigured Uplink Resource (PUR)", and the uplink transmission using the first type channel is called PUR transmission.

In this embodiment, the PUR transmission is performed in RRC_IDLE. The UE needs to judge whether the current TA is in a valid state before PUR transmission, and only when the TA is in a valid state can the UE perform the PUR transmission.

The base station transmits the adjustment information of the PUR on the first type downlink control channel or the downlink channel scheduled by the first type downlink control channel.

For example, when the coverage enhancement level of the UE is level 2 or 3, the adjustment information of the PUR includes at least one of: number of repetitions of the PUR transmission; or the TA corresponding to the PUR transmission.

For another example, when the coverage enhancement level of the UE is level 0 or 1, the adjustment information of the PUR includes at least one of: number of repetitions of the PUR transmission: the transmitting power information of the PUR transmission; or the TA corresponding to the PUR transmission.

In an example, the wireless communication system is configured with four coverage enhancement levels, which are respectively coverage enhancement level 0, 1, 2 and 3.

In this embodiment, the first type downlink control channel includes HARQ-ACK indication information for the PUR transmission, and the indication information is ACK.

Figure 8:
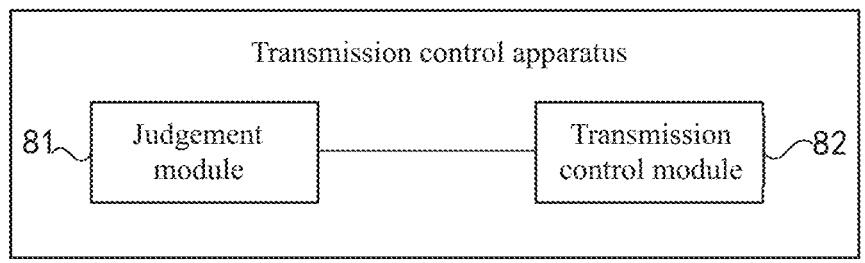
FIG. 8 is a schematic structural diagram of a transmission control apparatus according to an embodiment of the present disclosure.

FIG. 8 is a schematic structural diagram of a transmission control apparatus according to an embodiment of the present disclosure. As shown in FIG. 8, the apparatus can be installed in the UE, and includes a judgement module 81 and a transmission control module 82.

The judgement module 81 is configured to judge the validation of the TA.

The transmission control module 82 is configured to, in response to the TA being in a valid state, enable the UE to use the first type channel for data transmission in RRC_IDLE or RRC_INACTIVE.

In an implementation, the judgement module 81 is further configured to judge that the TA is in an invalid state when it is judged that a specific condition is satisfied at the judging time.

In an implementation, judging that a specific condition is satisfied at the judgment time includes one of the following:
  At least N1 judgment times in a first set of judgment times, a variation of a first measurement value exceeds a threshold value; where N1 is an integer greater than or equal to 1;
  At the last N2 judgment times in a first set of judgment times, a variation of a first measurement value exceeds a threshold value; where N1 is an integer greater than or equal to 1.

In an implementation, judging that a specific condition is satisfied at the judgment time includes one of the following:
  At least M1 judgment times in a second set of judgment times, a timer has expired; where M1 is an integer greater than or equal to 1;
  At the last M2 judgment times in a second set of judgment times, a timer has expired; where M2 is an integer greater than or equal to 1;
  At the preceding M3 judgment times in a second set of judgment times, a timer has expired; where M3 is an integer greater than or equal to 1.

In an implementation, judging that a specific condition is satisfied at the judgment time includes one of the following:
  A timer does not expire at a judgment time in a second set of judgment times; and at least K1 times before the judgment time in the second set of judgment times, a variation of a first measurement value exceeds a threshold value; where K1 is an integer greater than or equal to 1;

A timer does not expire at a judgment time in a second set of judgment times; and the last K2 times before the judgment time in the second set of judgment times, a variation of a first measurement value exceeds a threshold value; where K2 is an integer greater than or equal to 1.

In an implementation, the first measurement value includes at least one of: RSRP, RSRQ downlink SINR, downlink SNR, uplink SINR, uplink SNR, downlink path loss, or uplink path loss.

In an implementation, a judgment time in the second set of judgment times satisfies at least one of: an interval from a time domain position of a resource used by a next first type channel is greater than or equal to a first time length T1; or an interval from a time domain position of a resource used by a next first type channel is less than or equal to a second time length T2.

In an implementation, the judgement module 81 is further configured to judge whether a serving cell or a camping cell of the UE has changed before judging whether a specific condition is satisfied at the judging time.

Figure 9:
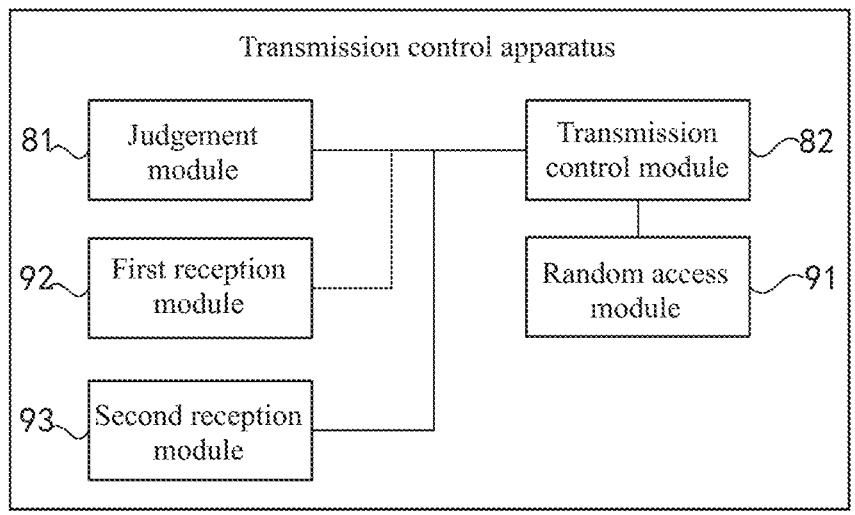
FIG. 9 is a schematic structural diagram of a transmission control apparatus according to yet another embodiment of the present disclosure.

In an implementation, as shown in FIG. 9, the apparatus further includes a random access module 91, configured to initiate a random access procedure in response to the TA being in an invalid state.

In an implementation, the random access module 91 is further configured to send a third message of the random access procedure to the base station, where the RRC message carried by the third message carries indication information for indicating RRC release.

In an implementation, the random access module 91 is further configured to receive a fourth message of a random access procedure from a base station, where the fourth message includes an RRC Connection Release message.

In an implementation, the RRC message include at least one of: RRC Connection Resume Request; or RRC Connection Request.

In an implementation, the indication information for indicating RRC release includes at least one of: RRC Connection Release indication; TA acquisition indication; or one or more IE, where the IEs are configured to have predefined values.

In an implementation, the random access module 91 is further configured to send a third message of the random access procedure to the base station, where the third message carries UE identification information, where the UE identification information is sent through a Control Element of Media Access Control (MAC CE).

In an implementation, the UE identification information includes one of: C-RNTI; Temporary C-RNTI carried in the second message of the random access procedure; or RNTI configured for UE to use the first type channel for uplink transmission in RRC_IDLE.

In an implementation, as shown in FIG. 9, the apparatus further includes a first reception module 92, configured to receive HARQ-ACK information sent by a base station for transmitting data on a first type channel, where the HARQ-ACK information is carried in DCI in a downlink control channel.

The HARQ-ACK information includes a first kind of ACK indication information or a second kind of ACK indication information.

The UE stops a detection on the downlink control channel, in response to the HARQ-ACK information being the first kind of ACK indication information, where the HARQ-ACK information indicates that the data transmitted by the first type channel is correctly received.

The UE performs a detection on the downlink control channel, in response to the HARQ-ACK information being the second kind of ACK indication information, where the HARQ-ACK information indicates that the data transmitted by the first type channel is correctly received.

In an implementation, as shown in FIG. 9, the apparatus further includes a second reception module 93, configured to receive adjustment information for a first type channel sent by a base station, where the adjustment information is carried in DCI in a downlink control channel, and the adjustment information has a value determined according to a power headroom (PHR) corresponding to the first type channel.

In an implementation, the value of the adjustment information determined according to a power headroom corresponding to the first type channel includes one of:

In response to the power headroom being greater than X1, the adjustment information includes a power adjustment value of the first type channel;

In response to the power headroom being greater than X2 and less than X1, the adjustment information includes a power adjustment value and a repetition number adjustment value of the first type channel;

In response to the power headroom being less than X2, the adjustment information includes a repetition number adjustment value.

In an implementation, determining the power adjustment value of the first type channel according to the size of the power headroom further includes the following scheme. When the power headroom value is PHR1, the power adjustment values of the first type channel include at least one of: ¼*PHR1; ²⁄₄*PHR1; ¾*PHR1; PHR1; −¼*PHR1; −²⁄₄*PHR1; −¾*PHR1; −PHR1; or 0.

FIG. 10 is a structural diagram of a transmission control apparatus according to an embodiment of the present disclosure. As shown in FIG. 10, the apparatus can be installed in a base station. The transmission control apparatus includes the following modules.

A third reception module 101 is configured to receive data sent by the UE on a first type channel in RRC_IDLE or RRC_INACTIVE.

A first sending module 102 is configured to send designated information to the UE through a downlink channel in response to a specific condition being satisfied.

For example, with respect to the first type UE, the third reception module 101 is configured to receive data sent by the first type UE on a first type channel in RRC_IDLE or RRC_INACTIVE; the first sending module 102 is configured to send the first information to the first type UE through a downlink channel in response to the first condition being satisfied.

In an implementation, the first condition includes at least one of the following:

HARQ-ACK indication for data transmitted on the first type channel being ACK;

A value of each of one or more fields in DCI being a predefined value;

A repetition number of transmitting on the first type channel belonging to a first set of numbers of transmission repetitions;

A coverage enhancement level of the UE corresponding to the first type channel belonging to a first set of coverage enhancement levels;

A transmitting power of the UE reaching a full power level in response to the UE transmitting data on the first type channel;

A power headroom value indicated by Power Headroom being less than or equal to a threshold.

The first information may include at least one of: a repetition number of transmitting on the first type channel; or the TA corresponding to the first type channel.

In an implementation, in response to the first condition including a HARQ-ACK indication for data transmitted on the first type channel being ACK, the ACK indicates the number of transmission repetitions and/or the TA, which are corresponding to the first information.

In an implementation, in response to the first condition including a value of each of one or more fields in DCI being a predefined value, the predefined value indicates the number of transmission repetitions and/or the TA, which are corresponding to the first information.

In an implementation, a repetition number of transmitting on the first type channel included in the first set of repetition numbers of transmitting is greater than or equal to a first numerical value.

In an implementation, a coverage enhancement level included in the first coverage enhancement level set is greater than or equal to a second numerical value.

FIG. 11 is a structural diagram of a transmission control apparatus according to an embodiment of the present disclosure. As shown in FIG. 11, the apparatus can be installed in a base station. The transmission control apparatus includes the following modules.

A fourth reception module 111 is configured to receive data sent by the UE on a first type channel in RRC_IDLE or RRC_INACTIVE.

A second sending module 112 is configured to send designated information to the UE through a downlink channel in response to a specific condition being satisfied.

For example, with respect to the second type UE, the fourth reception module 111 is configured to receive data sent by the second type UE on a first type channel in RRC_IDLE or RRC_INACTIVE; the second sending module 112 is configured to send the second information to the second type UE through a downlink channel in response to the second condition being satisfied.

In an implementation, the second condition includes at least one of the following:

HARQ-ACK indication for data transmitted on the first type channel being ACK;

A value of each of one or more fields in DCI being a predefined value;

A repetition number of transmitting on the first type channel belonging to a second set of numbers of transmission repetitions;

A coverage enhancement level of the UE corresponding to the first type channel belonging to a second set of coverage enhancement levels;

A transmitting power of the UE reaching a full power level in response to the UE transmitting data on the first type channel;

A power headroom value indicated by Power Headroom being less than or equal to a threshold.

The second information may include at least one of: a repetition number of transmitting on the first type channel; transmitting power information on the first type channel; or the TA corresponding to the first type channel.

In an implementation, in response to the second condition including a HARQ-ACK indication for data transmitted on the first type channel being ACK, the ACK indicates any one or a combination of: the number of transmission repetitions, transmitting power information or the TA, which are corresponding to the second information.

In an implementation, in response to the second condition including a value of each of one or more fields in DCI being a predefined value, the predefined value indicates any one or a combination of: the number of transmission repetitions, transmitting power information or the TA, which are corresponding to the second information.

In an implementation, a repetition number of transmitting on the first type channel included in the second set of repetition numbers of transmitting is less than or equal to a third numerical value.

In an implementation, a coverage enhancement level included in the second coverage enhancement level set is less than or equal to a fourth numerical value.

The functions of each module in each apparatus in the embodiments of the present disclosure can be referred to the corresponding description in the above method embodiments, and will not be described in detail here.

FIG. 12 is a flowchart of a transmission control method according to another embodiment of the present disclosure. As shown in FIG. 12, the method include the following steps.

At step S121, the UE receives a paging message sent by the base station, where the paging message includes configuration information of the first type random access channel. The configuration information of the first type random access channel may include at least one resource of the first type random access channel.

In this embodiment, the configuration information of the first type random access channel configures the resources of the random access channel of the non-competitive random access procedure.

The resources of the random access channel may include at least one of: time-frequency resources occupied by random access channels; or random access signals sent on the random access channels.

In this embodiment, a respective resource of the first type random access channel corresponds to a coverage enhancement level, a repetition number of transmitting on a random access channel, or a random access signal format.

In an implementation, after the UE sends a random access signal on the first random access channel, if a response message sent by the base station is not detected within a time window, the UE sends a random access signal on a second random access channel.

In this embodiment, the paging message is sent in the downlink control channel. A DCI carrying a paging message is scrambled by a Paging RNTI (P-RNTI) for Cyclic Redundancy Check (CRC).

In an implementation, the behavior of the UE includes the following examples.

Example one: when the configuration information of the first type random access channel includes a resource of the first type random access channel and satisfies a specific condition, the UE sends a random access signal on the first type random access channel.

When the specific condition is not met, the UE sends a random access signal on the second type random access channel, where the second type random access channel is a resource of a random access channel for competitive random access procedures.

In this example, the specific conditions include at least one of the following:

The coverage enhancement level of the UE is less than or equal to the coverage enhancement level corresponding to the first random access channel;

The repetition number of transmitting on the random access channel is less than or equal to the repetition number of transmitting supported by the first random access channel;

The RSRP value detected by the UE is greater than or equal to the RSRP value corresponding to the first random access channel;

The UE has no uplink data.

Example two: the UE selects a resource of the first type random access channel from the at least one resource of the first type random access channel, and sends a random access signal on the resource of the first type random access channel.

In this example, the UE selecting a resource of the first type random access channel from the at least one resource of the first type random access channel includes:

The coverage enhancement level corresponding to the first random access channel selected by the UE is greater than or equal to the coverage enhancement level of the UE;

The repetition number of transmitting corresponding to the first type random access channel selected by the UE is greater than or equal to the repetition number of transmitting on the random access channel when the UE sends the random access signal.

In this example, after successfully receiving the downlink data sent by the base station in the second message, the UE performs at least one of the following operations:

The UE sends HARQ-ACK information to the base station, and the HARQ-ACK indicates ACK;

The UE continues to detect the downlink control channel in the search space in a next time window.

The second message in this example may be Msg2 in the random access procedure. In the random access procedure, the Msg2 returned by the eNB to the UE carries TA information required by the UE. The starting time of the above time window is adjacent to the downlink control channel carrying the ACK indication, or there is an interval. The downlink control channel detected by the UE carries downlink channel scheduling information or uplink channel scheduling information. The UE transmits or receives data on the corresponding channel after receiving the scheduling information.

In this example, if the UE does not successfully receive the downlink data sent by the base station in the second message, and after feeding back NACK information, the UE does not detect the scheduling information, sent by the base station, of retransmission of the downlink data, then the UE sends a random access signal on the second type random access channel or the first type random access channel. The second type of random access channel is a resource of a random access channel used for competitive random access procedures.

Example three: when the UE needs to send uplink data, the UE performs the following operations: the UE sends a random access signal on the second random access channel.

In this embodiment, the UE may directly receive the service, data or control information sent by the base station through Msg2 in the random access procedure after receiving the paging message. Therefore, the signaling overhead of the UE entering RRC_CONNECT from RRC_IDLE can be saved. Alternatively, the UE may directly use the first type channel for uplink data transmission without switching from RRC connected state to RRC_IDLE after receiving the service, data or control information.

FIG. 13 is a schematic structural diagram of a UE according to an embodiment of the present disclosure. As shown in FIG. 13, the UE 130 provided by an embodiment of the present disclosure includes a memory 1303 and a processor 1304. The UE 130 also include an interface 1301 and a bus 1302. The interface 1301, the memory 1303 and the processor 1304 are connected by the bus 1302. The memory 1303 is configured to store instructions. The processor 1304 is configured to read the instructions to execute the technical schemes of the above method embodiments applied to the UE. Since the implementation principles and technical effects are similar, explanations are not repeated here.

Figure 14:
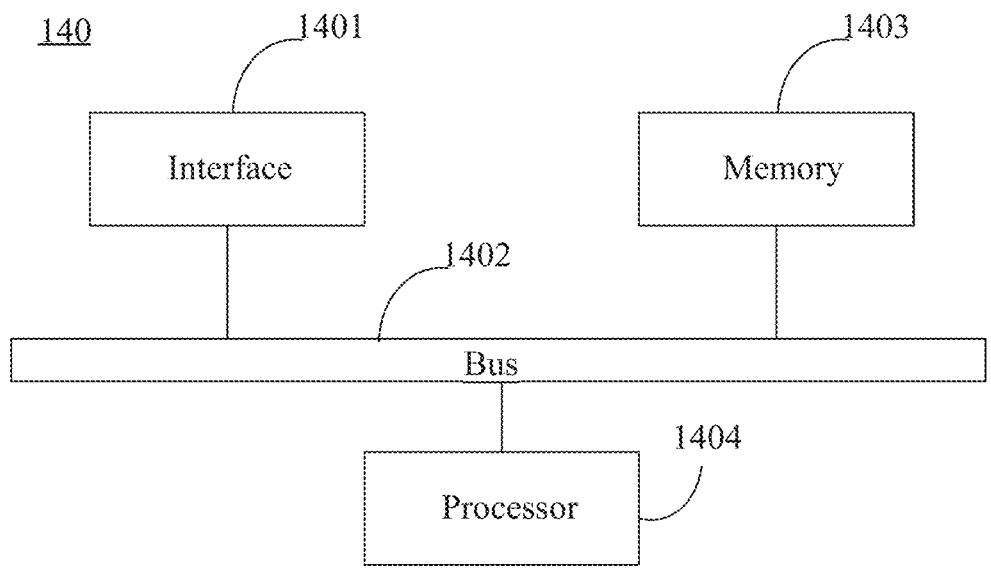
FIG. 14 is a schematic structural diagram of a base station according to an embodiment of the present disclosure.

FIG. 14 is a schematic structural diagram of a base station according to an embodiment of the present disclosure. As shown in FIG. 14, the base station 140 provided by an embodiment of the present disclosure includes a memory 1403 and a processor 1404. The base station also include an interface 1401 and a bus 1402. The interface 1401, the memory 1403 and the processor 1404 are connected through the bus 1402. The memory 1403 is configured to store instructions. The processor 1404 is configured to read the instructions to execute the technical schemes of the above method embodiments applied to the base station. Since the implementation principles and technical effects are similar, explanations are not repeated here.

Figure 15:
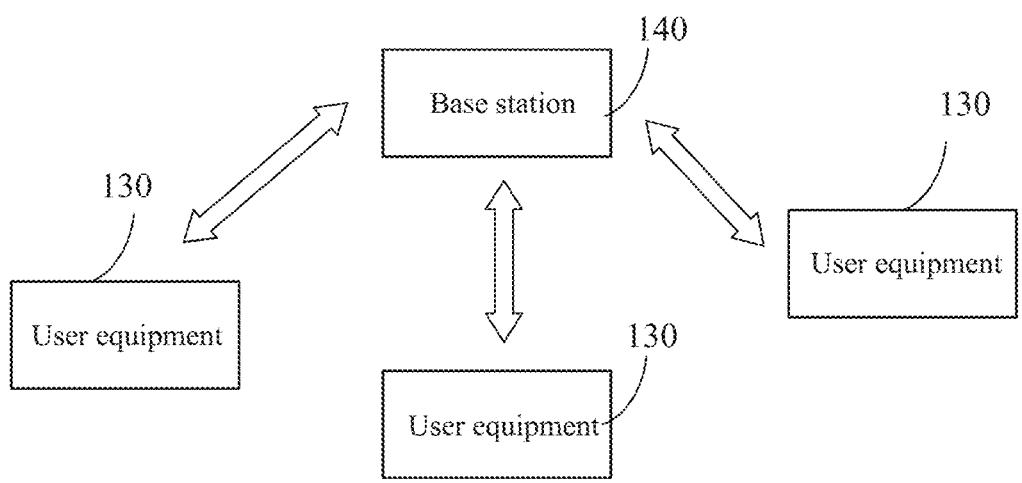
FIG. 15 is a schematic structural diagram of a communication system according to an embodiment of the present disclosure.

FIG. 15 is a schematic structural diagram of a communication system according to an embodiment of the present disclosure. As shown in FIG. 15, the system includes the UE 130 according to the above embodiments and the base station 140 according to the above embodiments. Communication systems of the embodiments of the present disclosure include, but are not limited to, Global System of Mobile communication (GSM), Code Division Multiple Access (CDMA), Wideband Code Division Multiple Access (WCDMA), General Packet Radio Service (GPRS), Long Term Evolution (LTE), Frequency Division Duplex (FDD), Time Division Duplex (TDD), Universal Mobile Telecommunication System (UMTS), Worldwide Interoperability for Microwave Access (WiMAX) or 5G New Radio (NR), etc.

An embodiment of the present disclosure provides a non-transitory computer-readable storage medium storing a computer program which, when executed by a processor, causes the processor to perform the method according to any one of the embodiments of the present disclosure.

The above are only example embodiments of the present disclosure, and are not intended to limit the protection scope of the present disclosure.

It should be understood by those having ordinary skills in the art that the term User Equipment covers all suitable types of wireless user equipment, such as a mobile phone, a portable data processing apparatus, a portable web browser or a vehicle-mounted mobile station.

Generally, various embodiments of the present disclosure may be implemented in hardware or dedicated circuits, software, logic, or any combination thereof. For example, some embodiments may be implemented in hardware, while other embodiments may be implemented in firmware or software that may be executed by a controller, microprocessor or other computing apparatus, although the present disclosure is not limited thereto.

Embodiments of the present disclosure may be implemented through executing computer program instructions by a data processor of a mobile apparatus, such as in a processor entity, or by hardware, or by a combination of software and hardware. Computer program instructions may be assembly instructions, instruction set architecture (ISA) instructions, machine instructions, machine-related instructions, microcode, firmware instructions, state setting data, or source code or object code written in any combination of one or more programming languages.

The block diagrams of any logic flows in the drawings of the present disclosure may represent program steps, or may represent interconnected logic circuits, modules and functions, or may represent a combination of program steps and logic circuits, modules and functions. A computer can be stored in a memory. The memory may be of any type suitable for the local technical environment and may be implemented using any suitable data storage technology. The memory in the embodiments of the present disclosure may be volatile memory or nonvolatile memory, or may include both volatile and nonvolatile memory. The nonvolatile memory can be Read-Only Memory (ROM), Programmable ROM (PROM), Erasable PROM (EPROM), Electrically EPROM (EEPROM) or flash memory, etc. The volatile memory may be Random Access Memory (RAM), which is used as an external cache. The RAM can include various forms, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM) and Direct Rambus RAM (DR RAM). The memories of the systems and methods described in the present disclosure include, but are not limited to, these and any other suitable types of memories.

A processor according to an embodiment of the present disclosure may be any type suitable for the local technical environment, such as but not limited to a general purpose computer, a special purpose computer, a microprocessor. Digital Signal Processor (DSP), Application Specific Integrated Circuit (ASIC), Field-Programmable Gate Array (FGPA) or other programmable logic devices, discrete gates or transistor logic devices, discrete hardware components, or processors based on multi-core processor architecture. The general-purpose processor can be a microprocessor or any conventional processor. The above processor can implement or execute the steps of each method in the embodiments according to the present disclosure. The software module can be located in random access memory, flash memory, read-only memory, programmable read-only memory, electrically erasable programmable memory, register and other conventional storage media in the field. The storage medium is located in the memory, and the processor reads the information in the memory and executes the steps of the above method in combination with its hardware.

The invention claimed is:

1. A transmission control method, comprising:
  judging validation of Timing Advance (TA); and
  initiating a random access procedure in response to the TA being in an invalid state;
  wherein judging validation of TA comprises:
  determining that the TA is in the invalid state in response to a determination that a specific condition is satisfied at a judgment time;
  wherein determining that a specific condition is satisfied at a judgment time comprises:
  determining that at least M1 judgment times in a second set of judgment times, a timer has expired; where M1 is an integer greater than or equal to 1; or
  determining that a timer does not expire at a judgment time in a second set of judgment times; and determining that at least K1 times before the judgment time in the second set of judgment times, a variation of a first measurement value exceeds a threshold value; where K1 is an integer greater than or equal to 1; and
  the judgment time in the second set of judgment times satisfies at least one of:
  an interval from a time domain position of a resource utilized by a next first type channel being greater than or equal to a first time length; or
  an interval from a time domain position of a resource utilized by a next first type channel being less than or equal to a second time length.

2. The method according to claim 1, wherein the first measurement value comprises at least one selected from a group consisting of Reference Signal Receiving Power (RSRP), Reference Signal Receiving Quality (RSRQ), Downlink Signal to Interference plus Noise Ratio (SINR), Downlink Signal to Noise Ratio (SNR), Uplink SNR, Downlink path loss, and Uplink path loss.

3. The method according to claim 1, wherein judging validation of TA further comprises:
  determining that the TA is in a valid state in response to a detection that a serving cell or a camping cell where a terminal device is located has not changed.

4. The method according to claim 1, wherein initiating a random access procedure comprises:
  sending a third message of the random access procedure to a base station, wherein a Radio Resource Control (RRC) message carried by the third message carries indication information for indicating RRC Release.

5. The method according to claim 1, wherein initiating a random access procedure comprises:
  receiving a fourth message of the random access procedure from a base station, wherein the fourth message comprises an RRC Connection Release message.

6. The method according to claim 1, wherein initiating a random access procedure comprises:
  sending a third message of the random access procedure to a base station, wherein the third message carries terminal device identification information, and the terminal device identification information is sent by a Control Element of Media Access Control (MAC CE).

7. The method according to claim 1, further comprising:
  receiving Hybrid Automatic Repeat Request Acknowledgement (HARQ-ACK) information sent by a base station for transmitting data on a first type channel, wherein the HARQ-ACK information is carried in Downlink Control Information (DCI) in a downlink control channel, and the HARQ-ACK information comprises a first kind of Acknowledgement (ACK) indication information or a second kind of ACK indication information;
  stopping, by a terminal device, a detection on the downlink control channel, in response to the HARQ-ACK information being the first kind of ACK indication information, where the HARQ-ACK information indicates that the data transmitted by the first type channel is correctly received; and
  performing, by a terminal device, a detection on the downlink control channel, in response to the HARQ-ACK information being the second kind of ACK indication information, where the HARQ-ACK information indicates that the data transmitted by the first type channel is correctly received.

8. The method according to claim 1, further comprising:
  receiving adjustment information for a first type channel sent by a base station, wherein the adjustment information is carried in DCI in a downlink control channel, and the adjustment information comprises a value determined according to a power headroom corresponding to the first type channel.

9. The method according to claim 1, further comprising:
in response to the TA being in a valid state, enabling the terminal device to utilize the first type channel for data transmission in RRC_IDLE or an inactive state of RRC (RRC_INACTIVE).

10. A non-transitory computer-readable storage medium storing a computer program which, when executed by a processor, causes the processor to perform the transmission control method according to claim 1.

* * * * *